E. M. AND A. G. RAYBURN.
POWER TRANSMISSION APPARATUS.
APPLICATION FILED MAY 20, 1918.
1,348,738. Patented Aug. 3, 1920.
3 SHEETS—SHEET 2.
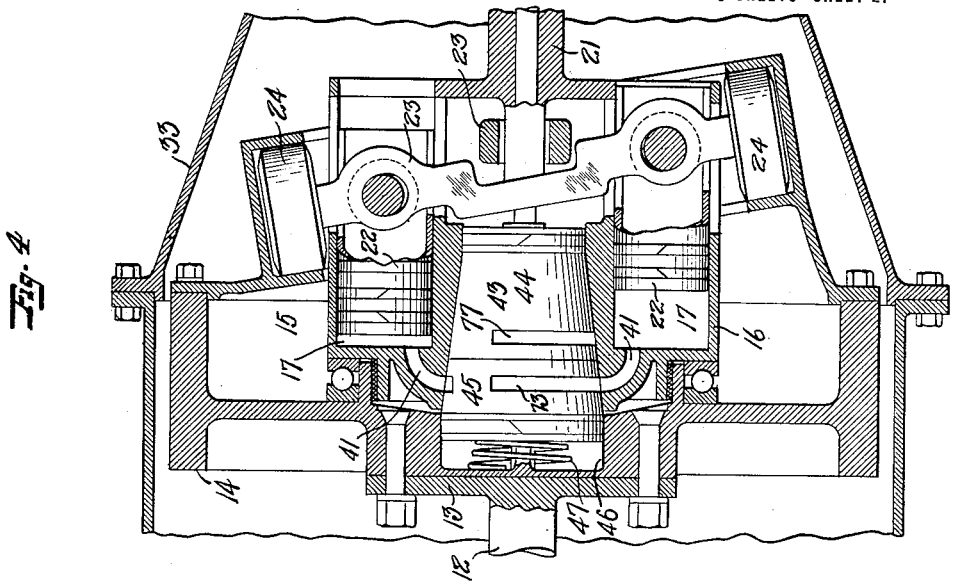
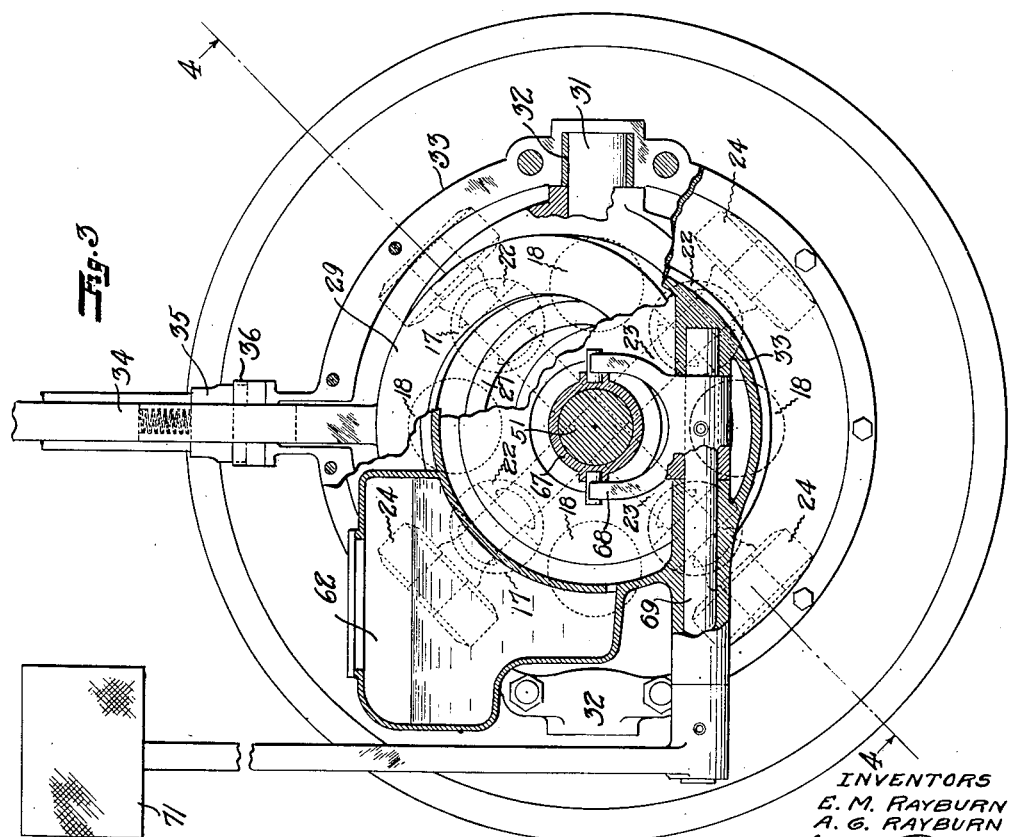
INVENTORS
E. M. RAYBURN
A. G. RAYBURN
BY White & Purst
ATTORNEYS E. M. AND A. G. RAYBURN.
POWER TRANSMISSION APPARATUS.
APPLICATION FILED MAY 20, 1918.
1,348,738.
Patented Aug. 3, 1920.
3 SHEETS—SHEET 3.
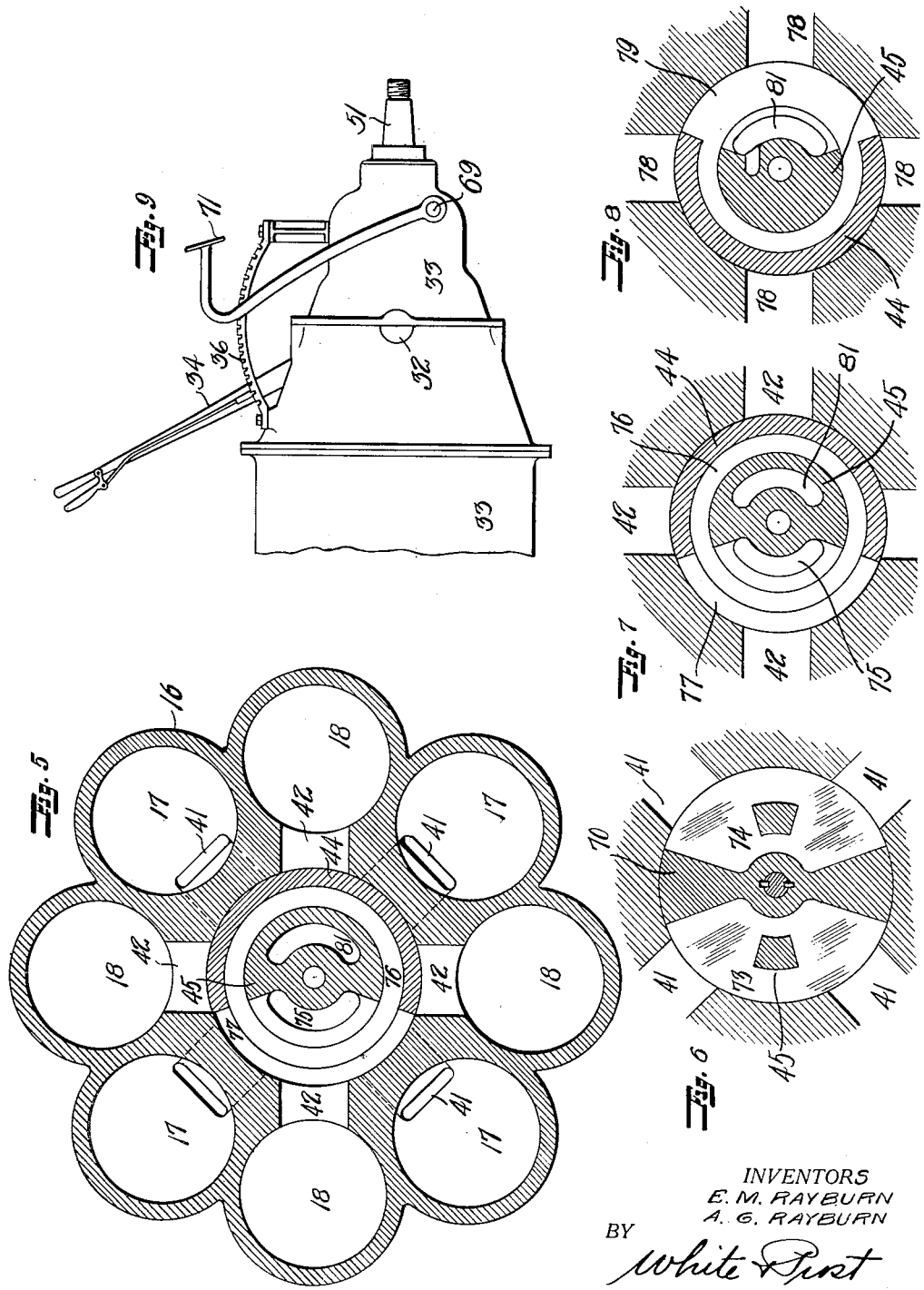
INVENTORS
E. M. RAYBURN
A. G. RAYBURN
BY
White & Prest
ATTORNEYS

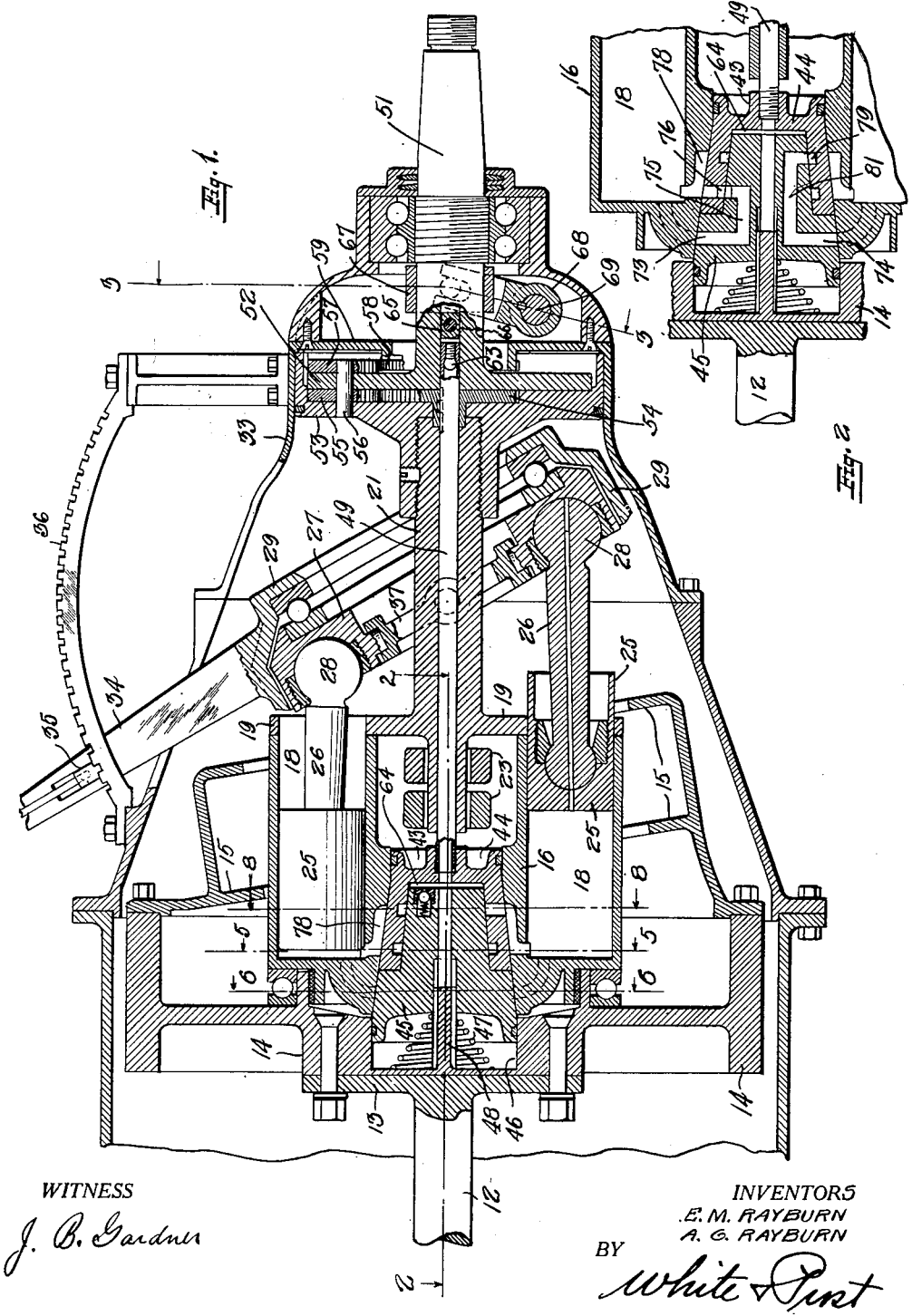

UNITED STATES PATENT OFFICE.

ELWYN M. RAYBURN AND ALDEN G. RAYBURN, OF SAUSALITO, CALIFORNIA.

POWER-TRANSMISSION APPARATUS.

1,348,738.  Specification of Letters Patent.  Patented Aug. 3, 1920.

Application filed May 20, 1918. Serial No. 235,517.

*To all whom it may concern:*

Be it known that we, ELWYN M. RAYBURN and ALDEN G. RAYBURN, citizens of the United States, and residents of Sausalito, county of Marin, and State of California, have invented certain new and useful Power-Transmission Apparatus, of which the following is a specification.

The invention relates to a variable speed power transmission apparatus for transmitting power from a driving element to a driven element and particularly to an apparatus employing a fluid as the power transmitting medium.

An object of the invention is to provide a variable speed power transmission apparatus of the fluid or hydraulic type which is highly efficient in operation.

Another object of the invention is to provide a fluid type variable speed transmission apparatus in which the resistance opposed to the movement of the fluid is employed to do useful work.

A further object of the invention is to provide a fluid type variable speed transmission apparatus which also serves as a clutch to engage or disengage the driving and driven elements without changing the speed ratio setting of the apparatus.

The invention possesses other advantageous features, some of which, with the foregoing, will be set forth at length in the following description where we shall outline in full, that form of the invention which we have selected for illustration in the drawings accompanying and forming part of the present specification. In said drawings we have shown one specific form of the transmission of our invention, but it is to be understood that we do not limit ourselves to such form, since the invention, as expressed in the claims, may be embodied in a plurality of forms. In said drawings we have shown the transmission embodied in a form which is particularly adapted for use in automobiles and other power propelled vehicles and while such use is large, the transmission is adaptable for use in other environments.

Referring to said drawings:

Figure 1 is a vertical longitudinal section through the apparatus of our invention arranged for installation in an automobile.

Fig. 2 is a section taken on the line 2—2, Fig. 1.

Fig. 3 is a section taken on the line 3—3 Fig. 1, parts of the casing being broken away to disclose the construction.

Fig. 4 is a section taken on the line 4—4 Fig. 3.

Fig. 5 is a section taken on the line 5—5 Fig. 1.

Fig. 6 is a section through the valve taken on the line 6—6 Fig. 1.

Fig. 7 is a section through the valve taken on the line 5—5 Fig. 1.

Fig. 8 is a section through the valve taken on the line 8—8 Fig. 1.

Fig. 9 is a side elevation of the apparatus.

The apparatus comprises a driving element adapted to be secured to the crank shaft of the engine and a driven element, flexibly connected thereto by a fluid medium, which is adapted to be secured to the propeller shaft of the vehicle. The crank shaft 12 is provided on its end with a flange or face plate 13 which is bolted to the driving member 14, which is preferably formed somewhat in the nature of a flywheel, to absorb the engine pulsations. Secured to the driving member 14, is a circular track or guideway 15, which is inclined to the axis of rotation of the driving member. Supported on the driving member and rotatable with respect thereto is a driven member 16, comprising a block having a plurality of cylinders 17—18 formed therein. The cylinders are spaced apart circumferentially in the block and an equal number of the cylinders 17—18 are provided, the cylinders 17—18 being arranged alternately, in the present instance there being four cylinders 17 and four cylinders 18. Secured to the outer ends of the cylinders is the flange 19 of the driven shaft 21.

Disposed in each cylinder 17 is a piston 22 and the diametrically opposed pistons 22 of each pair are pivotally connected to the rocker arm 23 which is provided on its ends with rollers 24 engaging in the inclined trackway 15. One rocker arm is employed for each pair of pistons 22, so that in the present construction, two rocker arms 23 are employed, one being perpendicular to the other. When the trackway is rotated with respect to the cylinder block or driven element, the pistons 22 are reciprocated in their cylinders. Disposed in the cylinders 18 are pistons 25 which are connected by the connecting rods 26 with the rotatable ring 27 in which sockets are provided for the ball treads 28 on the connecting rods. The ring 27 is rotatably mounted in the housing 29, which is provided at the sides with trunnions 31 engaging in bearings 32 in the stationary housing 33. The housing 29 is angularly adjustable, so that the stroke of the pistons 25 may be varied, and in the present instance the angular adjustment of the housing is produced by movement of the lever 34 secured thereto and extending upward through the casing. The lever is provided with a pawl 35 which engages a tooth in the quadrant 36, secured to the casing, to hold the housing and consequently the ring 27 in adjusted angular positions. The ring 27 is also connected to the driven shaft 21 so that it rotates synchronously therewith, by the toggle bar 37 pivoted at its ends to the ring and at its center to the shaft, the axis of the two pivots being perpendicular. This connection insures synchronous rotation while permitting the ring to rotate in a plane inclined to the axis of the driven shaft.

The cylinders are filled with a fluid, preferably oil, which is forced from one cylinder to the other as the driving element rotates with respect to the driven element. With the driven element stationary, a rotation of the driving element causes the rocker arms 23 and the pistons 22 to reciprocate, pumping oil from the cylinders 17, which we have designated the pump cylinders. Should a resistance be opposed to the flow of the oil from the pump cylinders, the driven element would be caused to rotate, substantially in direct proportion to the resistance offered. The oil is pumped from the cylinders 17 into the cylinders 18 and the pressure of this oil drives the pistons 25 and consequently the ring 27 which is connected to the driven shaft, thereby supplying power to the driven shaft. The resistance offered to the flow of the oil is therefore converted into energy and delivered to the driven shaft, so that only the energy consumed to overcome the frictional resistance to the passage of the oil through its conducting passages is lost and by making the passages of proper size this lost energy may be reduced to a minimum. For convenience we have termed the cylinders 18, the motor cylinders.

Each pump cylinder 17 is provided with an inlet and outlet port 41 and each motor cylinder 18 is provided with an inlet and outlet port 42, the two ports lying in different planes vertical to the axis of the shaft and means are provided for controlling the flow of oil to and from the various cylinders. Formed in the cylinder block or driven element, at the center of the circle of surrounding cylinders, is a conical valve seat in which is arranged the conical valve 43. The valve is formed in two parts, the stationary part 44 and the rotatable part 45, the rotatable part seating partly within the stationary part. At its forward end, the rotatable part extends into a seat 46 in the driving member 14 and is held in close contact with the stationary part by a spring 47 arranged in the seat 46 and surrounding the stem 48 which non-rotatably engages the valve part 45. The rotatable valve part 45, rotates synchronously with the driven member and its position is fixed with relation to the inclined trackway 15. Since the positions of the pump pistons are determined by their relative positions with respect to the inclined trackway and the position of the valve part 45 is fixed with relation to the trackway, the valve opens and closes the ports 41 at the proper times, with relation to the movements of the pump pistons. The rotatable valve part 45 is provided with two sector shaped chambers 73—74, divided by the diametrically disposed wall 70, the angular opening of the chambers on the face of the valve being such that a port 41 is continuously open during the movement of the piston in the corresponding cylinder, so that the oil may flow freely from or to the cylinders. Chamber 73 is the discharge chamber, into which the oil is forced by the pump pistons, and chamber 74 is the inlet chamber, from which oil flows into the pump cylinders on the suction stroke of the pistons therein. From the chamber 73, the oil flows through the longitudinal passage 75 into the annular passage 76 which is provided with an arc-shaped outlet port 77 which registers with the ports 42 on the motor cylinders. The port 77 is in the stationary valve part 44 and the cylinder block rotates over the valve, bringing the ports 42 consecutively into register with the port 77. Since the housing 29 is not rotatable and controls the timing of the motor pistons, and since the valve part 44 is stationary the valve part 44 bears a fixed relation to the movement of the motor pistons. The port 77 in the valve is of sufficient angular extent to hold the port 42 in communication with the oil pressure chamber 76 during the power stroke of the motor piston, and to cut off communication between the oil under pressure and the cylinder, as the piston reaches the end of its stroke.

The ports 42 are provided with longitudinal extensions 78 on the face of the valve seat, through which the oil exhausts from the motor cylinders. Formed in the stationary part 44 of the valve, is an exhaust port 79, adapted to register with the outlet ports 78. This port 79 is of substantially the same angular extent as the other ports, so that it uncovers the cylinder port during the exhaust stroke of the piston therein. From the exhaust port 79 in the valve, the exhaust oil under little or no pressure, passes back through the longitudinal passage 81 into the inlet chamber 74, whence it is drawn into the pump cylinders. The oil is therefore pumped by the pump pistons, into the motor cylinders where it does work on the driven shaft and is then exhausted back into the pump cylinders, and the valve properly times the flow of the oil to and from the cylinders.

By varying the angle of the housing 29, the stroke of the motor pistons is varied and consequently the amount of oil which may be pumped into the motor cylinders is varied. With the housing in the position indicated in Fig. 1, the stroke of the motor pistons is at the approximate maximum. A relatively large amount of oil may be pumped into the cylinders and consequently the ratio of rotation of the driving member with respect to the driven member is high. With the housing moved to a plane perpendicular to the axis of the driven shaft, there will be no reciprocation of the motor pistons, no oil may be pumped and consequently the driving and driven members must rotate in substantial synchronism. Between these two limits of movement of the housing, the stroke of the motor pistons is varied, varying the amount of oil which may be pumped into them and consequently varying the speed ratio between the driving and the driven members. When there is no outlet for the oil from the pump cylinders, the pistons therein are locked and consequently the two members must rotate in synchronism.

Means are provided for holding the stationary part 44 of the valve against rotation. The stationary part is secured to a hollow rod 49 extending through the driven shaft 21 and extending into the driving member 51, having on its end a flange 52 secured to the flange plate 53 screwed to the end of the driven shaft. The flange plate 53 forms a running oil tight joint with the casing 33. Secured to the hollow rod and disposed with the plate 53 is a gear 54, meshing with a gear 55 secured to a shaft 56 journaled in the flanged plates 52—53. Secured to the shaft 56 is a gear 57 meshing with a stationary gear 58 secured to the plate 59 which is secured to the casing 33. Gears 54 and 58 are the same size, and since gear 58 is held stationary, gear 54 is held stationary and the rod 49 is held against rotation, regardless of the rotation of the driven shaft. The chamber inclosed between the flange plates 52—53 is substantially oil tight and a reservoir 62 for supplying oil to the cylinders is in communication therewith. The hollow rod is provided with an aperture 63 opening into the oil chamber and oil flows through this aper-
ture and the hollow rod, to the chamber 64 between the two valve parts, whence it flows by the spring pressed check valve into the low pressure oil passage 81 in the valve.

The valve controls the flow of oil to and from the various cylinders and by unseating the valve, the pump cylinders are placed in direct communication, and thereby the transfer of power from the driving to the driven element is interrupted. The valve therefore serves as a clutch to release or engage the driving and driven elements and means are provided for moving the valve longitudinally to unseat it. Arranged in a slot in the driving member 51 is a block 65 bearing against the end of the hollow rod and provided with rollers 66 which project beyond the surface of the driving member. Surrounding the driving member is a sleeve 67 which is movable longitudinally by the forked yoke 68, to move the block 65 forward. The yoke is secured to a shaft 69 to which is attached a pedal 71, so that when the pedal is depressed, the valve is unseated and the driven member is released from the driving member. When the pedal is released, the spring 47 returns the valve to its seat.

We claim:

1. A variable speed power transmission apparatus comprising a driving member, a driven member, a fluid pump carried by the driven member, means on the driving member for operating said pump, and a fluid operated motor carried by the driven member and receiving fluid from said pump and applying power to the driven member.

2. A variable speed power transmission apparatus comprising a driving member, a driven member, means operative by a relative rotation of the driving and driven members for pumping fluid, and a fluid operated motor carried by the driven member and receiving fluid from said pump and driving the driven member.

3. A variable speed power transmission apparatus, comprising a driving member, a driven member, a fluid pump carried by the driven member, means operative by the relative rotation of the driving and driven members for operating said pump, a fluid motor carried by the driven member and receiving fluid from said pump and driving the driven member and means for varying the amount of fluid pumped into said motor.

4. A variable speed power transmission apparatus comprising a driving member, a driven member, a cylinder on said driven member, a piston in said cylinder, means operative by a relative rotation of said members for reciprocating said piston whereby fluid is pumped from said cylinder, a second cylinder on said driven member adadpted to receive fluid from said first cylinder, a piston in said second cylinder mediately connected to said driven member and means for varying the stroke of said second piston.

5. A variable speed power transmission comprising a driving member, a driven member, a plurality of fluid pump cylinders on said driven element, pistons in said cylinders, means operative by a rotation of the driving member with respect to the driven member for reciprocating said pistons whereby fluid is pumped, a plurality of fluid motor cylinders on said driven element receiving fluid from said pump cylinders, pistons in said motor cylinders mediately connected to said driven member and means for varying the stroke of said latter pistons.

6. A variable speed power transmission apparatus comprising a driving member, a driven member, means operative by a relative rotation of said members for pumping fluid, means for opposing the flow of said fluid whereby said fluid is caused to do work and means for applying said work to the driven member.

7. A variable speed power transmission apparatus comprising a driving member, a driven member, means operative by the relative rotation of said members for pumping fluid and means connected to the driven member for opposing a variable force to the flow of said fluid.

8. A variable speed power transmission apparatus comprising a driving member, a driven member, a plurality of fluid pump cylinders and fluid motor cylinders carried by the driven member, pistons in said cylinders, means operated by rotation of the driving member with respect to the driven member for reciprocating the pump cylinders, a valve for timing the flow of fluid from the pump cylinders to the motor cylinders, pistons in said motor cylinders and means mediately connecting the motor pistons with the driven member.

9. A variable speed transmission apparatus comprising a driving member, a driven member, a plurality of pump cylinders and fluid motor cylinders on said driven member, pistons in said pump cylinders, means operative by a rotation of the driving member with respect to the driven member for reciprocating said pump pistons, a valve for timing the flow of fluid from the pump cylinders to the motor cylinders, pistons in said motor cylinders, means mediately connecting the motor pistons with the driven member and means for varying the stroke of the motor pistons.

10. A variable speed transmission apparatus comprising a driving member, a driven member, a plurality of pump cylinders and fluid motor cylinders on said driven member, pistons in said pump cylinders, means operative by a rotation of the driving member with respect to the driven member for reciprocating said pump pistons, a valve for timing the flow of fluid from the pump cylinders to the motor cylinders, and means for unseating said valve whereby connection is established directly between all of the pump cylinders.

11. A variable speed power transmission apparatus comprising a driving member, a driven member, a plurality of circumferentially disposed spaced pump cylinders on said driven member, a plurality of intermediate fluid motor cylinders on said driven member, pistons in said pump cylinders, a circular trackway on the driving member inclined to the axis of rotation thereof, means connected to said pistons and engaging said trackway, whereby a relative rotation of said members will reciprocate said pistons to pump fluid, means controlling the flow of said fluid from the pump cylinders to said motor cylinders, pistons in said motor cylinders, a rotatable element connected to said motor pistons and to said driven member and means for varying the plane of rotation of said element.

12. A variable speed power transmission apparatus comprising a driving member, a driven member, a plurality of circumferentially disposed spaced pump cylinders on said driven member, a plurality of intermediate fluid motor cylinders on said driven member, pistons in said pump cylinders, a circular trackway on the driving member inclined to the axis of rotation thereof, means connected to said pistons and engaging said trackway, whereby a relative rotation of said members will reciprocate said pistons to pump fluid, means controlling the flow of said fluid from the pump cylinders to said motor cylinders, pistons in said motor cylinders, a rotatable ring to which said motor pistons are connected, means connecting said ring with the driven member, a pivoted housing in which said ring is rotatable and means for moving said housing about its pivots to vary the plane of rotation of said ring.

13. A variable speed power transmission apparatus comprising a driving member, a driven member carried thereby and rotatable with respect thereto, a plurality of spaced circumferentially disposed pump cylinders on the driven member, a plurality of intermediate fluid motor cylinders on said driven member, a valve seat in said driven member, ports opening into said cylinders and onto said valve seat, and a valve in said seat for controlling the flow of fluid to and from said cylinders.

14. A variable speed power transmission apparatus comprising a driving member, a driven member carried thereby and rotatable with respect thereto, a plurality of spaced circumferentially disposed pump cylinders on the driven member, a plurality of intermediate fluid motor cylinders on said driven member, a valve seat in said driven member, ports opening into said cylinders and onto said valve seat, a valve in said seat for controlling the flow of fluid from said pump cylinders to said motor cylinders and vice versa and means for unseating said valve to establish direct communication between all of said ports.

15. A variable speed power transmission apparatus comprising a driving member, a driven member, a reciprocating fluid pump carried by the driven member and operated by a relative rotation of said members to pump fluid, a reciprocating fluid motor carried by said driven member into which said pump forces fluid, said motor operating to drive the driven member, and means for varying the stroke of said motor.

16. A variable speed power transmission apparatus comprising a driving member, a driven member, a plurality of fluid pump cylinders on said driven member, a plurality of fluid motor cylinders on said driven member, pistons in said pump cylinders arranged to be reciprocated by a relative rotation of said members, pistons in said motor cylinders mediately connected to said driven member, a valve seat in said driven member, ports connecting all of said cylinders with said valve seat, a two part valve in said seat arranged to control the flow of fluid through said ports, one of said valve parts controlling the pump cylinder ports and the other valve part controlling the motor cylinder ports, means for rotating the former valve part synchronously with the driving member and means for holding the latter valve part stationary.

17. A variable speed power transmission apparatus comprising a driving member, a driven member, a plurality of fluid pump cylinders on said driven member, a plurality of fluid motor cylinders on said driven member, pistons in said pump cylinders arranged to be reciprocated by a relative rotation of said members, pistons in said motor cylinders mediately connected to said driven member, a valve seat in said driven member, ports connecting all of said cylinders with said valve seat, a valve in said seat controlling the flow of fluid to and from all of said cylinders, a rod connected to said valve and extending through said driven member and a pedal associated with said rod for unseating said valve.

18. A variable speed power transmission apparatus comprising a driving member, a driven member, a plurality of fluid pump cylinders on said driven member, a plurality of fluid motor cylinders on said driven member, pistons in said pump cylinders arranged to be reciprocated by a relative rotation of said members, pistons in said motor cylinders mediately connected to said driven member, a valve seat in said driven member, ports connecting all of said cylinders with said valve seat, a valve in said seat controlling the flow of fluid to and from all of said cylinders, a rod connected to said valve and extending through said driven member, means for holding said rod against rotation and means for moving said rod longitudinally to unseat said valve.

19. A variable speed power transmission apparatus comprising a driving member, a driven member, a plurality of fluid pump cylinders on said driven member, a plurality of fluid motor cylinders on said driven member, pistons in said pump cylinders arranged to be reciprocated by a relative rotation of said members, pistons in said motor cylinders mediately connected to said driven member, a valve seat in said driven member, ports connecting all of said cylinders with said valve seat, a valve in said seat controlling the flow of fluid to and from all of said cylinders, passages in said valve through which the fluid passes, a hollow rod connected to said valve and through which fluid passes to said valve and means for moving said rod to unseat said valve.

20. A variable speed power transmission apparatus comprising a driving member, a driven member, a plurality of fluid pump cylinders on said driven member, a plurality of fluid motor cylinders on said driven member, pistons in said pump cylinders arranged to be reciprocated by a relative rotation of said members, pistons in said motor cylinders mediately connected to said driven member, a valve seat in said driven member, ports connecting all of said cylinders with said valve seat, a valve in said seat controlling the flow of fluid to and from all of said cylinders, a passage in said valve into which fluid discharges from the motor cylinders and means for introducing fluid from an external source of supply into said passage.

21. A variable speed power transmission apparatus comprising a driving member, a driven member, a plurality of fluid pump cylinders on said driven member, a plurality of fluid motor cylinders on said driven member, pistons in said pump cylinders arranged to be reciprocated by a relative rotation of said members, pistons in said motor cylinders mediately connected to said driven member, a valve seat in said driven member, ports connecting all of said cylinders with said valve seat, a valve in said seat controlling the flow of fluid to and from all of said cylinders, a passage in said valve into which fluid discharges from the motor cylinders, a hollow rod connected to said valve and communicating with said passage and a fluid supply reservoir communicating with said hollow rod.

22. A variable speed power transmission apparatus comprising a driving member, a driven member, a plurality of fluid pump cylinders on said driven member, a plurality of fluid motor cylinders on said driven member, pistons in said pump cylinders arranged to be reciprocated by a relative rotation of said members, pistons in said motor cylinders mediately connected to said driven member, a valve seat in said driven member, ports connecting all of said cylinders with said valve seat, a valve in said seat controlling the flow of fluid to and from all of said cylinders, a fluid passage in said valve, a hollow rod connected to said valve and communicating with said passage and extending through said driven member, a chamber into which the opposite end of said rod opens and a fuel supply reservoir connected to said chamber.

In testimony whereof, we have hereunto set our hands at San Francisco, California, this 11th day of May, 1918.

ELWYN M. RAYBURN.
ALDEN G. RAYBURN.

In presence of—
H. G. PROST.